United States Patent Office 3,302,165
Patented Jan. 31, 1967

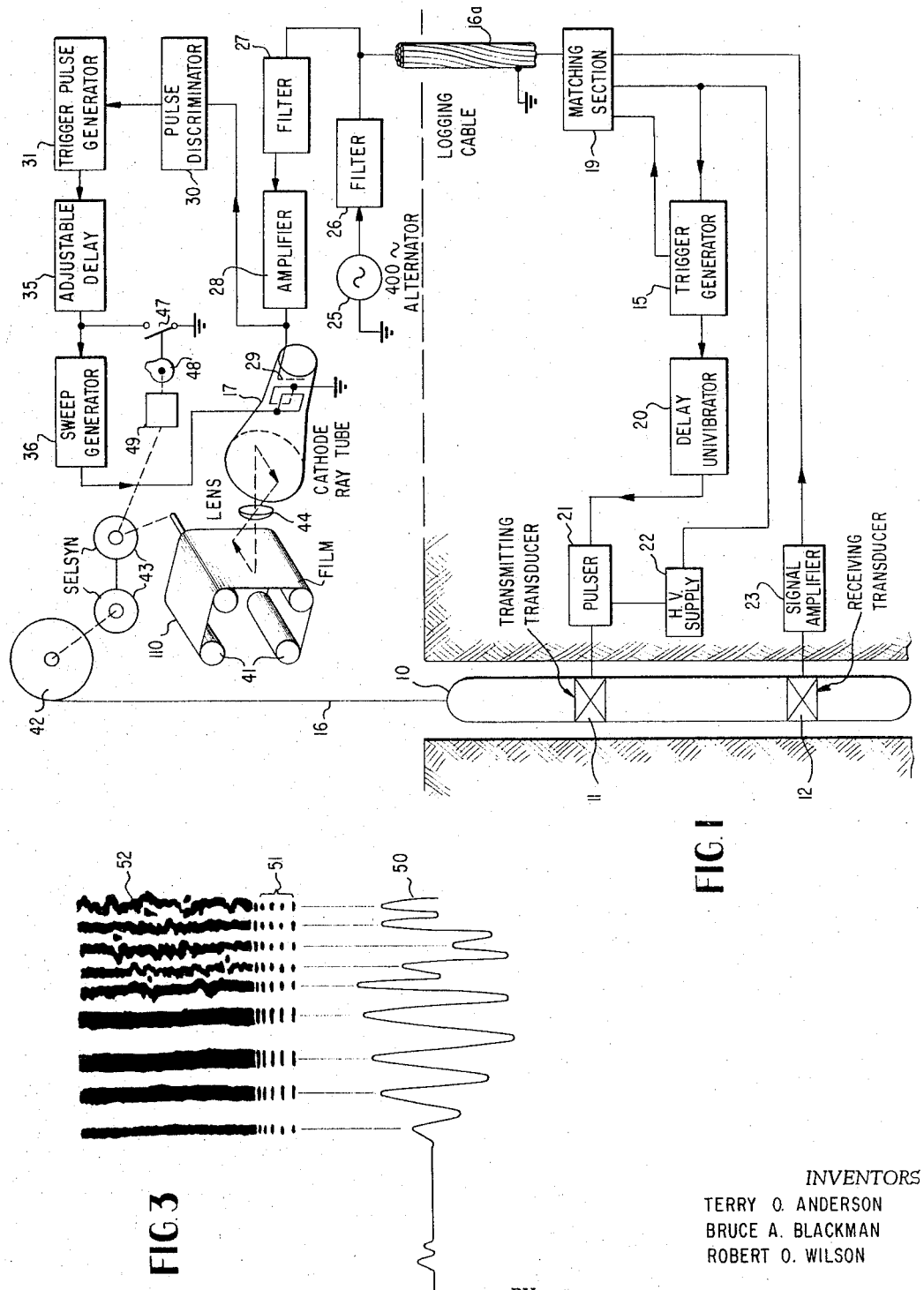

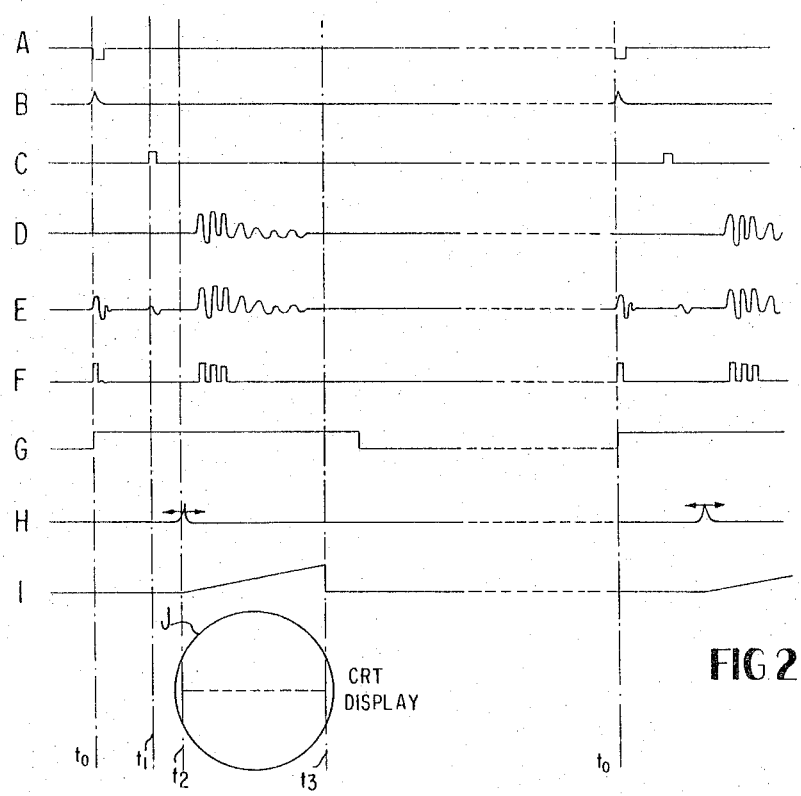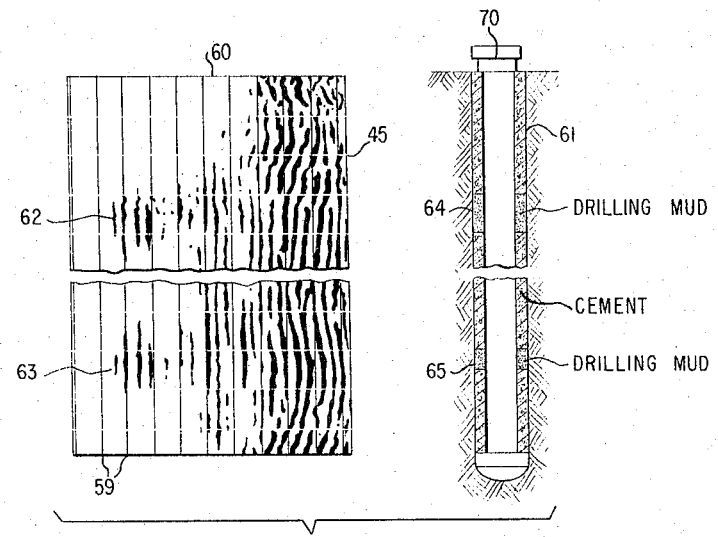

3,302,165
WELL LOGGING WITH SINGLE CHANNEL CABLE
Terry O. Anderson, Bruce A. Blackman, and Robert O. Wilson, Duncan, Okla., assignors to Halliburton Company, Duncan, Okla., a corporation of Delaware
Filed Dec. 18, 1963, Ser. No. 331,598
10 Claims. (Cl. 340—18)

This invention relates to a novel method and apparatus for well logging, and is more particularly directed to the proper time correlation in sensing data downwell and presenting the information thereby obtained at the surface.

Well logging necessarily requires the installation of sensing equipment in a sonde which is lowered into the well by a hoisting cable. In many situations it is impractical, if not substantially impossible, to incorporate in the sonde the necessary recording equipment for making a permanent record. Consequently, most well logging operations telemeter the acquired information to the surface for presentation. This operation requires the incorporation of at least one insulated electrical conductor in the physical structure of the cable. Due to the physical demands on the cable, the electrical transmission characteristics are far from those which can be achieved for electrical transmission lines under normal circumstances. The present invention is directed to the solution of correlating the reception of a periodic information signal downwell with its presentation at the surface while employing the very limited electrical transmission characteristics of such cables.

Periodic downwell data acquisition is used in a number of logging operations. In general, these operations comprise the recurrent generation of physically transient conditions in the well or in the surrounding formation, the relaxation history of which is measured against time. The sensed data is transmitted to the surface via the cable channel for permanent recording. Representative of such logging operations are nuclear magnetism logging and seismic logging. In the former, the formation responds to the cessation of a polarizing magnetic field, to generate a characteristic signal train. In the latter system, a mechanical shock or wave train is generated downwell and the resulting disturbance is detected.

In such systems, it is particularly difficult to apply downwell recording technique, because an enormous mass of information is accumulated as the logging process is recurrently carried out at closely spaced successive depth increments. Also in these operations, due to the short duration and high frequency characteristics of the detected information, it is convenient and almost essential to employ a cathode ray type of presentation, either for direct observation or for recording. Oscilloscope presentation equipment, for all practical purposes, must be installed at the surface, and consequently hoisting conductor type cable is required for transmission to the surface. At the same time, however, difficulties are immediately encountered in effectuating and maintaining the necessary synchronism when generating the transient condition downwell and the presentation of the signal by the oscilloscope at the surface. This is particularly true because the validity and interpretation of the information is highly dependent upon the accuracy and consistency of the time scale against which it is measured.

The application of the usual synchronizing techniques in a well logging environment is attended with extreme difficulty. Synchronizing signals triggering the generation of the transient condition are in substantial coincidence therewith and further tend to persist in the cable and obscure or confuse initial portions of the detected information signal itself. The present invention overcomes these problems in the present technological field by supplying synchronizing data for the necessary correlation of the generation of the transient condition downwell and its presentation at the surface by appropriate recording means such as an oscilloscope, and at the same time maintains the cable transmission channel free for the exclusive use of information signal transmission as required. Thus, therefore, the present invention permits accurate presentation of all the received data without obscuring interference from the synchronizing signals necessary to such recurrent types of well logging.

A primary advantage of the present invention is that it permits the use of a hoisting cable having a single transmission channel for both synchronizing and information signals of entirely different types, and, in addition, for the necessary power supply for the downwell instrumentation. At the same time, however, the invention is directly applicable to the use of multi-conductor hoisting cable, since the use of a multi-conductor cable falls far short of providing a plurality of independent electrical transmission channels due to the inherent coupling unavoidably encountered in such structures.

Where a single cable is employed to supply power downwell and at the same time convey recurrent information signals to the surface and to transmit synchronizing signals in the desired location, the difficulties encountered in the electrical transmission characteristics of such cables are highly compounded by the necessary use of decoupling filters. Filter operation is severely limited in respect to the transient conditions encountered. It is, furthermore, extremely difficult to secure impedance matching over the relatively broad frequency bands involved under the inherent necessities of using rejection and pass band filters for the respective signal separation. Additionally, uniform characteristic cable impedance is difficult to achieve and maintain in a hoisting cable, which is necessarily employed under working conditions that require repeated bending over sheaves and hoisting drums.

It is accordingly the object of the present invention to provide improved well logging and improved apparatus therefor in a system where a recurrent information signal is generated downwell and presented at a surface installation.

The present invention will be further explained as applied to a seismic logging system in which a mechanical disturbance is recurrently generated downwell and a history of each disturbance detected and transmitted to the surface for presentation. Such a seismic exploration, in an uncased hole, provides information as to the surrounding formation. The same information is attainable in a cased cemented hole, and in the latter circumstances additional valuable information is attained as to the condition of the bond between the casing and the cement, as well as that between the cement and the encompassing formation, and as to the presence of voids in the cement itself. In the preferred application of the invention, there is presented at the surface information permitting evaluation of at least all these conditions.

Other objects, advantages and features of the present invention will become further apparent from the following description when taken in conjunction with the accompanying drawings wherein:

FIGURE 1 is a block diagram of preferred circuitry for the present invention,

FIGURE 2 illustrates the respective waveforms of the electric signals present in the circuit of FIGURE 1 with time relation thereof, FIGURE 3 represents the signal received in the information channel for representation at the surface installation and a preferred type of recording therefor, and FIGURE 4 illustrates a recording of the information obtained with the present invention for a particular test bore hole.

The seismic logging system shown in FIGURE 1 includes a downwell sonde 10 having a transmitting electromechanical transducer 11, and spaced therefrom by an insulating portion of the sonde, a mechanical-electrical transducer 12. For seismic logging, it is necessary recurrently to excite the transmitting transducer and to convey the transient acoustic signal received by transducer 12 to the surface installation immediately thereafter. In the system shown, this type of operation is achieved in response to signals supplied by the master synchronizing trigger generator 15 in the downhole instrumentation. It will be understood, however, that the present invention can be directly embodied in a system where the trigger generator 15 would be included in the surface equipment.

Sonde 10 is supported for the logging operation by cable 16, also shown in enlarged section at 16a. In the embodiment shown, this cable comprises a single conductor which is insulated from the outer steel wire sheathing to form a type of concentric line. Synchronizing signals from trigger generator 15, the received information signals from transducer 12, and the downwell power are all transmitted through cable 16.

At the surface installation, oscilloscope 17 is provided for presenting the information signal as a visual pattern, which may also, in the preferred embodiment, be continuously recorded in correlation with depth measurements determined from the length of cable run down the bore hole.

It will be understood that the sweep presentation effected by oscilloscope 17 must be precisely correlated with the time phase at which the received signal is originated in transducer 12. As explained above, the prior art has attempted to secure such synchronism by transmitting synchronizing pulses of the cable 16 in immediate coincidence with the responsive operation of the transmitting transducer and the beginning of the indicating cycle of the sweep circuit 36 for oscilloscope 17. Due primarily to cable characteristics, however, such synchronizing signals tend to "ring out" in a prolonged transient oscillation which persists in the single transmission channel, or is coupled unavoidably thereinto if separate cable conductors are used.

According to the present invention, the information signals are entirely separated in time from the synchronizing signal by a predetermined phase delay, thus permitting accurate synchronism of the downwell received signal with the presentation of that information at the surface, but totally avoiding any electrical interference between the synchronizing signal and the information signal. For this purpose, trigger generator 15 operates as a master timing control oscillator recurrently generating synchronizing signals. At the surface installation and the sonde, the synchronizing signals are responded to after a predetermined phase delay to initiate operation of the transmitting transducer and the indication cycle of the cathode ray oscilloscope. his phase delay may differ in various embodiments, but in all cases is of sufficient duration to permit the transmission transients of the synchronizing signals to subside.

In the embodiment shown in FIGURE 1, as noted above, trigger generator 15 is included in the sonde instrumentation. It supplies simultaneous signals to a delay univibrator 20 and to the surface installation through matching section 19 and cable 16.

The delay univibrator 20 triggers pulser 21 which energizes the transmitting transducer 11 to emit a short burst of mechanical energy from the sonde. The signal emitted by transducer 11 may be a short impulse or a brief wave train. Pulser 21 is energized from a high voltage supply 22 which may preferably be energized by an alternating voltage delivered by cable 16. Such voltage is conveniently supplied at 400 cycles. Matching section 19 includes suitable circuitry for the segregation of the power supply frequency from the synchronizing and information signals by means of suitable decoupling circuits for the different frequency ranges involved.

Matching section 19 also receives the signal from transducer 12 as amplified in the signal amplifier 23.

At the surface installation, power supply generator 25 is coupled to transmission line 16 through filter 26 which rejects the information and synchronization signals, presenting a high impedance thereto. At the same time, filter 26 efficiently transmits the power supply frequency, 400 cycles in this specific instance.

The synchronization and information signals, but not the power supply frequency, are delivered through filter 27 to amplifier 28. The output of amplifier 28 is applied to the control grid 29 of cathode ray tube 17 for intensity modulation of the cathode ray beam for the preferred type of presentation. As will be understood, the beam modulation is effective for indication only during the interval during which the beam is scanned across the cathode ray tube screen, and that during this indication period the transmission channel through cable 16 is free of all transients resulting from the transmission of the synchronizing signal.

The output signal from amplifier 28 is, however, an extremely complex sequence. The synchronizing signal generated by trigger generator 15 in the sonde consists essentially of a high level pulse delivered through matching section 19 to cable 16. As delivered to amplifier 28, however, the cable transmission characteristics coupled with the transient operation of filters 26 and 27 under pulse signal incidence converts the generated pulse to a transiently damped wave train. The network essentially preserves the initiation phase of such signal with the output of trigger generator 15, with due respect to the transmission time through cable 16. The latter is essentially uniform and depends only on the total length of cable being employed in the logging operation. This damped wave train is first squared up in pulse discriminator 30 to supply a steeply rising output coincident in phase with the beginning, for instance, of a positive going initial portion of the original trigger signal generated in the sonde. Preferably, pulse discriminator 30 may constitute a Schmitt trigger circuit operative to supply an output voltage at a uniform level during the persistence of an input voltage of positive polarity above a predetermined level. The operating characteristics of the pulse discriminator can generally be designed in any specific installation to supply a single pulse output with the desired leading edge phase. It may also respond to high signal level components of the same polarity during the subsequent information signal period, but this is rendered immaterial by the operation of trigger pulse generator 31 which is a monostable blocking oscillator with a sufficiently long recovery time as to remain insensitive throughout the subsequent information signal persistence, and relaxing to its steady state condition of sensitivity only shortly prior to the ensuing output from pulse discriminator 30 generated upon the next subsequent recurrence of the synchronizing signal from trigger generator 15.

The leading edge of the output from trigger pulse generator 31 establishes the beginning of a time delay period correlated with the delay of univibrator 20 in the sonde. For this purpose, its output is fed to adjustable delay circuit 35 which thereafter generates a delayed timing pulse after a predetermined selected time delay to initiate the horizontal sweep circuit 36 of indicator tube 17. Sweep generator 36 is of the normally quiescent type generating a sweep voltage of predetermined amplitude and duration in response to an input synchronizing signal.

According to the present invention, sweep presentation is delayed until a short time prior to the arrival of the first impulses at receiving transducer 12 to the recording or indicating medium. This delay period is primarily a function of the physical distance between the two transducers 11 and 12. It is not, for all purposes, necessary to present the entire succession of signal values developed by receiving transducer 12.

An entirely satisfactory presentation of the seismic information can also be obtained by using the signal derived from receiving transducer 12 to produce vertical scan deflection, applying it to a second pair of deflection plates, not shown, in cathode ray tube 17.

In the preferred embodiment, however, the variable density trace may be photographically recorded on film 40 suitably driven on feed rolls 41 in correlation with the depth at which soundings are being taken. For this purpose, cable 16 may be run over a sheave 42 which is coupled to the film drive mechanism by selsyns 43.

A suitable lens, diagrammatically shown at 44, is employed to project the oscilloscope image onto the film. If desired, time scale intervals may be recorded on the film as a series of lines spaced across its width. A suitably ruled graticule of transparent plastic (not shown) may be positioned adjacent the screen of oscilloscope 17 for this purpose. Either opaque or illuminated rulings may be employed. The vertical rulings 59 on log 60, FIGURE 4, typify recording with illuminated rulings on the graticule.

It is also convenient to provide depth interval indications directly upon film 40 as it records the seismic signals. This is effected by periodically interrupting presentation of logging information by oscilloscope 17. In the circuit, sweep action is suspended by grounding the sweep trigger voltage from delay generator 35 through switch 47. The latter is momentarily closed at cable pay-out intervals by a suitable cam shown diagrammatically at 48, coupled through gearing 49 to slave selsyn 43. This produces horizontal unexposed lines 45, shown in FIGURE 4, on the film. Instead of grounding the trigger signal, switch 47 could connect grid 29 of oscilloscope 17 to ground, or to a fixed voltage source, to override beam modulation by the logging signal to produce similar depth indicia.

The essential time relationships in the operation of the circuit of FIGURE 1, with representative waveforms, are shown in FIGURE 2. At line A are shown synchronizing signals from trigger generator 15. This is a recurrent rectangular signal reproduced uniformly at a predetermined repetition rate. In the preferred embodiment, where a 400 cycle power supply is employed, trigger generator 15 may be operated in synchronism therewith.

While the waveform shown at A may be employed for transmission on the cable 16, the circuitry of trigger generator 15 also supplies synchronizing pulses as shown at line B. A pulse of this shape is better adapted to the cable and system characteristics. These two specific pulses are in precise phase coincidence. The keying pulser 21 is generated by delay univibrator 20 as shown at line C in FIGURE 2. The signal received by transducer 12 is shown at line D. At the surface, the received sequence is shown at line E of FIGURE 2. The timing pulse as transmitted at B is delivered to amplifier 28 as the extended, damped wave train first shown in line E. Operation of the transducing transmitter 11 by pulser 21 results in the second signal shown at line E, which is a result of unavoidable coupling and interaction with the current surge drawn from power supply source 25. This signal has no operational effect at the surface installation.

As also shown at line E of FIGURE 2, the ensuing time phase sector is free of all interference signals for transmission of the received information signal from transducer 12, which is transmitted to the surface as shown in the figure with very substantial fidelity. All the sequence of signals at line E are present at the output of amplifier 28, and are applied to control grid 29 of the cathode ray tube 17. The sweep sequence of this tube is programmed so that only the information signal, or the desired portion thereof, is indicated on its screen. As above referred to, pulse discriminator 30 also receives a signal at line E and its output is indicated at line F. The trigger pulse generator 31 responds only to the squared output pulse from the pulse discriminator which is in time synchronism with the timing pulse B (save for uniform phase delays due to the cable transmission time which are not represented in FIGURE 2). While the output from pulse discriminator 30 as shown at F may include subsequent pulses generated by its response to the information signal, these latter pulses are eliminated as shown at G from the output of trigger pulse generator 31. Adjustable delay circuit 35 responds to the pulses shown at G to generate the desired delayed pulse at an adjustably preselected time as shown at line H. The signal at line H triggers sweep generator 36 to generate sweep voltage I having the desired initiation phase, amplitude, and time duration as required by the purposes of the system. At J is shown a preferred phase sector representing the indication period during which the received information signal is presented on the indicator tube.

As noted above, cable transmission delays are not indicated on FIGURE 2, but in fact showings D through J are actually delayed by this constant factor relative to showings A through D. The delay time of the adjustable delay circuit 35 is suitably adjusted to secure the desired synchronism between operation of the transmitting transducer and the cathode ray sweep circuit. The delay is always sufficient to permit subsidence of the transmission transients, however.

The information record recorded on film 40 will be further explained in connection with FIGURE 3, where the information is shown as a voltage amplitude plot 50 against time at the lower portion of the figure. Under beam current modulation, such a signal appears on the face of the tube as shown in the dashed sequences at 51. While the tonal graduation present in such a recording cannot be shown in the drawing, it will be readily appreciated by those learned in the art, or by reference to Patent 3,093,810 in which it is further explained. During logging operations, it is preferred to correlate the advancing speed of the film with the seismic exploration repetition frequency so that essentially continuous traces are produced longitudinally along the film, fusing the separate indications 51. The resulting presentation is shown in the upper portion of FIGURE 3 at 52.

Turning briefly to FIGURE 4, there is illustrated a recorded presentation effectuated by the logging system of FIGURE 1 in schematic correlation with a test well section. Zero time phase is shown at the left of recording 60. The upper part of the recording shows, as the earlier received signals, wave energy refracted through the formation back to the receiver. The later arrivals represent energy propagated to the receiver through the fluid within the casing. These signals chaactereize section 61 of the well, where the bonds between the casing 70 and the cement as well as the cement and the formation are highly effective.

Portions 62 and 63 of recording 60, however, correspond to uncemented sections 64 and 65, respectively, of the well. Here, early arrivals represent energy traveling rapidly down the casing and received at a high amplitude. In the cemented portion of the well, energy traveling at high velocity in the casing is attenuated by its bond to the cement sheath.

It has been found that a seismic log of a successfully cemented well, when taken with a logging system of the type here disclosed, correlates quite accurately with the same type of log of the uncased well insofar as signals from the formation are concerned.

It will accordingly be understood that the method of the present invention remotely indicates the recurrent information signal generated in the downwell location, which is coupled to a surface location by a conductor cable, and in which the master timing signal is generated at a predetermined control frequency and transmitted to the other location through the cable, while at both locations, surface and downwell, time delayed signals are generated after transients subside in predetermined phase delays, responsive to which delayed signals both the generation of the downwell transient and the surface indicator presentation is initiated.

While the preferred method, and exemplary apparatus components of the present invention have been specifically described, it will be understood that modifications and variations may be made therein without departing from the scope of the invention as understood by those skilled in the art. Such modifications and variations are considered to be within the purview and scope of the invention as defined in the appended claims.

We claim:

1. A system for logging a well bore hole comprising:
    (a) a sonde station for exploring the well,
    (b) a surface station having periodically operable information presentation means,
    (c) cable means consisting of a single pair of conductor means connecting the stations,
    (d) synchronizing means at one of the stations for recurrently generating electrical timing signals,
    (e) means coupling the synchronizing means to the cable means for transmission of timing signals to the other station,
    (f) time delay means at each station responsive to the output of the synchronizing means to generate electrical time delayed signals after damping of cable transmission transients from the timing signals,
    (g) transmitter means in said sonde station periodically operable in response to electrical trigger signals at the sonde station coupled to the cable means responsive to the local time delayed signals, and
    (h) means at the surface station for initiating operation of the information presentation means responsively to the local time delayed signal to present the logging signals in predetermined time relationship with the operation of the logging means after damping of cable transmission transients resulting from timing signal transmission.

2. The system of claim 1 wherein the synchronizing means is operative simultaneously to generate rectangular timing signals for use at said one station and peaked timing signals for cable transmission.

3. The system of claim 1 wherein the synchronizing means is positioned at the sonde station.

4. The system of claim 1 wherein the information presentation means comprises a cathode ray oscilloscope coupled to the cable means for beam current modulation, and further including:
    (i) cable responsive beam modulation control means operative at predetermined cable extension increments to stabilize the beam modulation at a predetermined value for providing depth increment information presentation.

5. A system for logging a well bore hole comprising:
    (a) a sonde station for exploring the well,
    (b) a surface station having periodically operable information presentation means,
    (c) cable means consisting of a single pair of conductor means connecting the stations,
    (d) synchronizing means at one of the stations for recurrently generating electrical timing signals,
    (e) means coupling the synchronizing means to the cable means for transmission of timing signals to the other station,
    (f) a pulse forming circuit at the other station immediately operative responsively to reception of a timing signal to generate an output pulse,
    (g) pulse selection means at the other station responsive to an output pulse to supply an output signal in coincidence with the initially formed output pulse synchronized with the reception of the timing signal and thereafter inoperable until substantially the time of generation of the succeeding timing signal,
    (h) first time delay means at the other station responsive to the output of the pulse selection means to generate time delayed signals after a period at least greater than the time for damping of cable transmission transients from the timing signal,
    (i) second time delay means at said one station responsive to the output of the synchronizing means to generate time delayed signals after a period at least greater than the time for damping of cable transmission transients from the timing signals,
    (j) transmitter means in said sonde station periodically operable in response to electrical trigger signals at the sonde station coupled to the cable means responsive to the local time delayed signals, and
    (k) means at the surface station for initiating operation of the information presentation means responsively to the local time delayed signal to present the logging signals in predetermined time relationship with the operation of the logging means after damping of cable transmission transients resulting from timing signal transmission.

6. A seismic system for logging a well bore hole comprising:
    (a) a sonde station for exploring the well,
    (b) a surface station having periodically operable beam modulated oscilloscope information presentation means,
    (c) cable means consisting of a single pair of conductor means connecting the stations,
    (d) synchronizing means in the sonde for recurrently generating electrical timing signals,
    (e) means coupling the synchronizing means to the cable means for transmission of timing signals to the surface station,
    (f) seismic transducer means in the sonde periodically operable in response to the electrical trigger signals,
    (g) time delay means in the sonde responsive to the output of the synchronizing means to generate time delayed trigger signals after the damping of cable transmission transients from the timing signal coupled with the seismic transducer means to initiate operation thereof,
    (h) means coupled to the cable means for supplying a logging signal at the sonde station responsive to operation of the seismic transducer means,
    (i) a pulse forming circuit at the surface station immediately operative responsively to reception of a timing signal to generate an output pulse,
    (j) pulse selection means at the surface station responsive to an output pulse to supply an output signal in coincidence with the initially formed output pulse synchronized with reception of the timing signal and thereafter inoperable until substantially the time of generation of the succeeding timing signal,
    (k) time delay means at the surface station responsive to the output of the pulse selection means to generate time delayed signals after damping of cable transmission transients from the timing signal, and
    (l) sweep cricuit means to initiate operation of the oscilloscope information presentation means responsively to the output of the last recited time delay means.

7. The system of claim 6 wherein the surface station comprises beam current modulated oscilloscope information presentation means, further including:
    cable responsive oscilloscope control means operative in dependency on cable pay-out to interrupt oscilloscope logging signal information presentation at predetermined sonde depth increments for providing depth information presentation.

8. The method of remotely presenting periodic electrical logging signals generated at a downwell station coupled to a surface station by two conductor cable means for signal transmission, comprising:
    (a) recurrently generating timing signals at one station and (b) transmitting the same by a cable means transmission channel to the other station,
(c) generating time delayed signals responsively to the timing signals at both stations after damping of cable transmission transients from the timing signals,
(d) generating electrical logging signals at the downwell station in response to the local time delayed signals,
(e) transmitting the electrical logging signals to the surface station via the same cable means transmission channel, and
(f) initiating presentation of the electrical logging signals at the surface station responsively to the local time delayed signals.

9. The method of claim 8 wherein the time delayed signals are generated at the surface station after those at the downwell station and slightly prior to reception of the electrical logging signals at the surface station.

10. The system of claim 1 wherein the sonde station comprises an acoustic transmitter.

References Cited by the Examiner

UNITED STATES PATENTS

| Re. 25,928 | 12/1965 | Geyer et al. | 340—18 |
| 2,651,027 | 9/1953 | Vogel | 340—18 |
| 3,050,027 | 8/1962 | Tixier | 181—.5 |
| 3,062,314 | 11/1962 | Vogel et al. | 340—18 X |
| 3,081,838 | 3/1963 | Platt | 181—.5 |
| 3,170,136 | 2/1965 | Howes | 340—18 |

BENJAMIN A. BORCHELT, *Primary Examiner.*

SAMUEL FEINBERG, *Examiner.*

R. M. SKOLNIK, *Assistant Examiner.*